Aug. 30, 1966          L. M. PUSTER          3,270,158
    LIQUID LEVEL CONTROL WITH MEANS TO PREVENT SHORT
                    CYCLING OF THE RELAY
Filed Oct. 31, 1961                         2 Sheets-Sheet 1

INVENTOR.
Louis M. PUSTER
BY
A. A. O'Brien

INVENTOR.
LOUIS M. PUSTER
BY
A. A. O'Brien

United States Patent Office 3,270,158
Patented August 30, 1966

3,270,158
LIQUID LEVEL CONTROL WITH MEANS TO PREVENT SHORT CYCLING OF THE RELAY
Louis M. Puster, Knoxville, Tenn., assignor to Robertshaw Controls Company, a corporation of Delaware
Filed Oct. 31, 1961, Ser. No. 148,922
1 Claim. (Cl. 200—84)

This invention relates to liquid level controls and more particularly to a float-operated liquid level control having a temperature-compensated magnetic relay.

An object of the invention is to provide an improved float-operated liquid level control having a magnetic relay provided with means adapted to compensate for variation in the ambient temperature.

Another object of the invention is to provide an improved float-operated liquid level control having a magnetic relay provided with a bimetallic spring adapted to compensate for variations in the ambient temperature.

A further object of the invention is to provide an improved float-operated liquid level control having a temperature-compensated magnetic relay wherein adjustment means are provided, whereby to vary the actuation of the magnetic relay in accordance with changes in the liquid level.

A still further object of the invention is to provide an improved float-operated liquid level control having a temperature-compensated magnetic relay wherein the float is slidably mounted on a stem, and float adjusting means operatively associated with the stem are provided whereby to change the position of the float with respect to the stem and thereby vary the actuation of the magnetic relay in response to the rise and fall of the float.

With these and other objects in view, which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful application to the particular construction which, for the purpose of explanation, have been made the subject of illustration.

Figure 1:
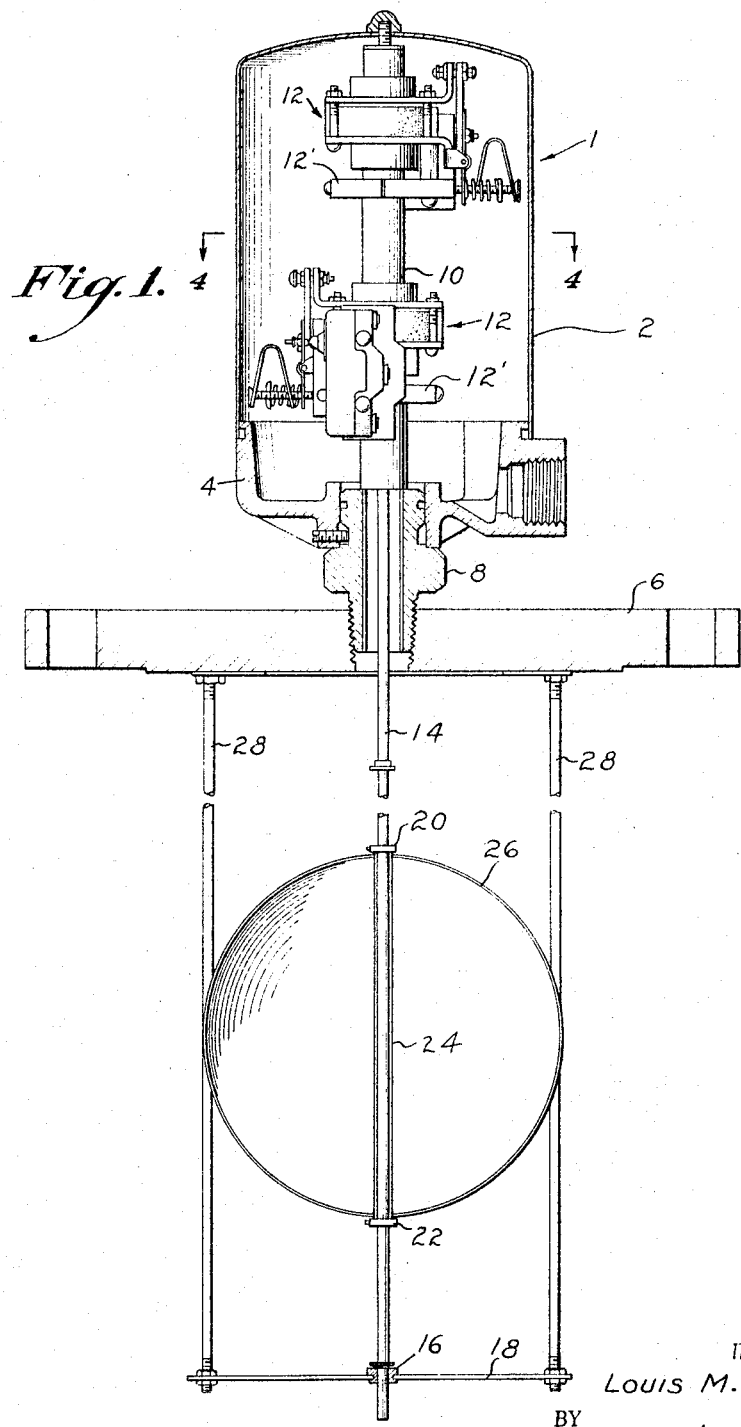
FIG. 1 is a vertical sectional view showing two temperature-compensated magnetic relays operatively associated with a float stem.

Referring to the drawings, and more particularly to FIG. 1, the temperature-compensated magnetic relay, designated generally by reference numeral 1, comprises a housing 2 having a head 4 secured to a cover plate 6 by means of a union 8 threaded therein. Although the temperature-compensated magnetic relay is shown in FIG. 1 as a top-mounted flanged model, it should be understood that the magnetic relay together with its housing could be mounted in other arrangements, such as, screwing or welding the head 4 to an external float cage or attaching it to an elbow-type body for side-mounted applications. A tube 10 is rigidly mounted within the housing 1, to which tube the temperature-compensated magnetic relays 12, to be described more fully hereinafter, are secured by means of clamps 12'. A stem 14, having one end portion slidably mounted within the tube 10 and having its opposite end portion slidably mounted in a bushing 16 secured to a plate 18, is provided with adjustable collars 20 and 22. A tube 24 having a float 26 secured thereto is slidably mounted on the stem 14 between the adjustable collars, as shown. Suitable rods 28 are provided for guiding the float, each of the rods having one end secured to the cover plate 6, the opposite end thereof being secured to the plate 18.

The temperature-compensated relay 12 (FIGS. 5 and 6) comprises a permanent magnet 30, magnetized in such fashion that the opposite parallel faces are of opposite magnetic polarity, said magnet being mounted between an upper pole shoe 32, having a pole piece 34 and a lower pole shoe 36. An armature 38 is pivotally mounted on the lower pole shoe as at 40 and is spaced from the upper pole piece 34 to form an air gap 42 therebetween. The upper and lower pole shoes and the armature are made of magnetic steel and form the magnetic circuit of the relay. A magnetic steel shunt member 44 is adjustably mounted on the threaded upper end portion of the stem 14 by means of nuts 46 and 48.

Figure 5:
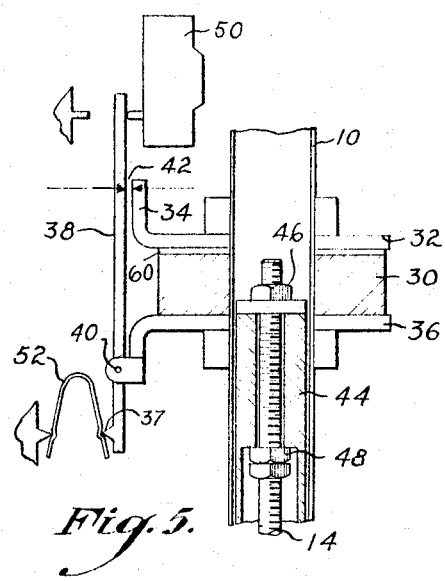
FIGS. 5 and 6 are fragmentary views showing the "in" and "out" positions, respectively, of the magnetic relay armature.
Figure 6:
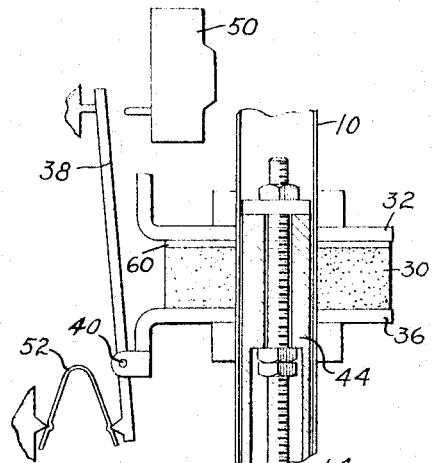

The upper end of the armature 38 is adapted to actuate an electric switch 50, said switch being closed when the armature is moved to the "in" position (FIG. 5) and open when the armature is moved to the "out" position (FIG. 6). It is to be understood that although only one switch is shown, the magnetic relay is adapted to actuate two electric switches, one or two pneumatic valves, or a combination of one switch and one valve. The lower end of the armature is biased in a counterclockwise direction, tending to move the armature to its "out" position by means of an inverted V-shaped leaf spring 52 and a coil spring 54, said springs being provided with screws 56 and 58, respectively, to adjust their biasing force acting on the armature.

Figure 2:
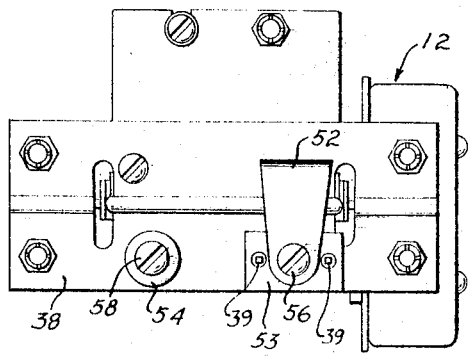
FIG. 2 is a side elevational view of one of the temperature-compensated magnetic relays.
Figure 3:
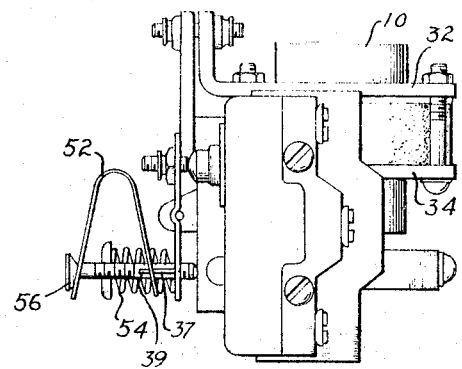
FIG. 3 is an end elevational view of one of the temperature-compensated magnetic relays.
Figure 4:
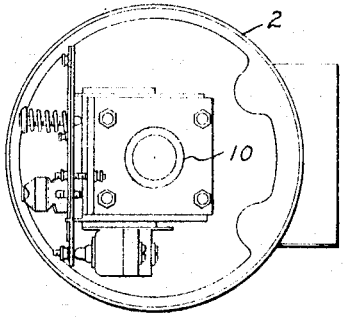
FIG. 4 is a view taken along line 4—4 of FIG. 1.
Figure 7:
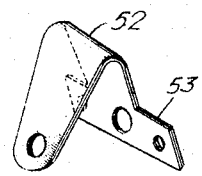
FIG. 7 is a perspective view of the V-shaped spring shown in FIG. 3.

As is illustrated in FIG. 7, the inverted V-shaped spring is integrally provided with a generally rectangular heel plate 53 having mounting apertures adjacent each end. The lower edge of armature plate 38 has a pair of tangs 37 bent perpendicularly out of the plane of the plate 38 so as to present bearing surfaces for the heel plate 53. The extremities of the tangs 37 (FIGS. 2 and 3) are narrowed down to form aligning projections 39 and are of such dimensions as to extend through the apertures on the heel plate 53. With such an arrangement, the tangs 37 present a pair of aligned bearing surfaces which act as knife edge pivot points for the heel plate 53 and the entire spring 52 is stabilized so as not to tilt or rotate about the screw 56.

From the above described arrangement, it will be seen that shunt 44 will move into and out of the magnet 30 in response to the rise and fall of float 26. When shunt 44 is withdrawn from magnet 30, most of the magnetic lines of force pass through armature 38 and air gap 42, setting up a strong attraction between armature 38 and pole piece 34; hence, the armature is pulled to the "in" position against the outwardly biasing force of springs 52 and 54 thereby closing the switch 50. When shunt 44 is moved within the magnet 30 due to the rise of float 26, part of the magnetic lines of force are diverted away from armature and pass through the shunt. The attraction between armature 38 and pole piece 34 is thereby reduced; hence, springs 52 and 54 force the armature to the "out" position, thereby opening the switch 50.

It will thus be seen that the operation of the magnetic relay depends upon establishing the proper force-balance between the magnetic pull on the armature and the mechanical force of springs 52 and 54. Accordingly, the magnetic relay is so calibrated that when shunt 44 moves into the magnet 30, the magnetic pull on the armature 38 is less than the biasing force of springs 52 and 54; hence, the springs push the armature to the "out" position. conversely, when shunt 44 is removed from the magnet, the magnetic pull is greater than the spring force; hence, the armature is pulled to the "in" position.

However, it is known that the pull of a permanent magnet is influenced by the ambient temperature; that is, as the temperature rises, the magnetic pull decreases and as the temperature falls, the magnetic pull increases. Thus, it will be seen that if no temperature-compensation were provided, it would be possible for the ambient temperature to rise so high that the magnetic pull would be reduced to a point where it could no longer move armature 38 to the "in" position upon removal of shunt 44 from the magnet. A substantial decrease in the ambient temperature would have the reverse effect; namely, as the temperature falls the magnetic pull would become so great that springs 52 and 54 would not move armature 38 to its "out" position when the shunt is moved into the magnet.

In order to overcome the above-noted disadvantage, a bimetallic spring 52 is provided, which is so formed that its spring force varies with temperature in the same direction and by approximately the same degree that the magnetic pull varies with temperature; namely, as the ambient temperature falls the biasing force of spring 52 acting on armature 38 tending to move it to the "out" position increases and, conversely, as the ambient temperature increases, the biasing force of spring 52 decreases. Thus, the proper force balance is maintained over a wide range of temperatures.

As shown in FIG. 1, two magnet relays are mounted on tube 10 with shunt 44 operating each relay at different liquid levels or at approximately the same liquid level. This is accomplished by loosening clamp 12', sliding the relay 12 along tube 10, to the desired position, and then tightening the clamp.

An additional feature of the present invention resides in the fact that the actuation of the magnetic relay can be adjusted through a wider range of the liquid level in response to the rise and fall of float 26. With the collars 20 and 22 and the nuts 46 and 48 adjusted as shown in FIGS. 1, 5 and 6, float 26 and shunt 44 are rigidly connected to stem 14 so that armature 38 will be operated between the "in" and "out" positions with a minimum change in the liquid level.

If it is desired that the magnetic relay should operate during a greater change in the liquid level, nuts 46 and 48 are spaced farther apart thus allowing shunt 44 to be freely slidable on stem 14 between the nuts 46 and 48. Under this arrangement, assuming that the liquid level has risen to a point where the lower nut 48 has contacted the shunt 44 and moved it upwardly into magnet 30 to cause armature 38 to move to its "out" position, as the liquid level falls, the float, stem and shunt also begin to drop, the weight of the shunt causing it to ride against the lower nut 48. A position is soon reached, however, where the weight of the shunt is balanced by the upward and sidewise pull of the magnet, so that the shunt remains stationary as the liquid level, float and stem continue to drop. When the top nut 46 engages the shunt, the weight of the float and stem act against the magnetic force, thereby pulling the shunt downwardly until the armature is moved to its "in" position.

Upon rise of the liquid level, shunt 44, being pulled upwardly by magnet 30, will ride against top nut 46, however, a point is soon reached when the sidewise pull of the magnet is strong enough to hold the shunt firmly against the tube 10. This prevents further movement of the shunt until it is engaged by lower nut 48, after which it travels upwardly with the float and stem until the armature moves to its "out" position.

In the above described arrangement, the shunt 44 must not be too heavy, otherwise it would continuously ride the lower nut 48, causing "short-cycling" during the fall of the liquid level. Since the shunt must be of comparatively light weight, provision must be made for preventing it from being prematurely pulled away from lower nut 48 and into the magnet during the rising level cycle, since this would also cause "short-cycling." In accordance with the present invention, "short-cycling" is prevented by inserting a non-magnetic spacer 60 between top pole shoe 32 and magnet 30. This serves to increase the sidewise pull and decrease the upward pull of the magnet on the shunt. It will thus be seen that the shunt is held firmly against the tube 10 and tends to remain in a stationary position thereon until it is engaged by nut 48 during the rising liquid level cycle, and by nut 46 during the falling liquid level cycle. In connection with the above described arrangement, it will be noted that although the shunt need travel only a sufficient distance to cause the "in" and "out" operation of the armature, the float and the stem must travel an additional distance equal to the spacing of the nuts, thereby increasing the liquid level differential.

If it is desired that the magnetic relay should be actuated through a still wider range of the liquid level, the shunt 44 is rigidly secured to stem 14 as shown in FIGS. 5 and 6, and the collars 20 and 22 may be spaced farther apart so that float 26 is freely slidable on the stem between the collars. By means of this arrangement, the float 26 is free to slide on stem 14 in response to a change in the liquid level until it engages either collar 20 or 22, at which time stem 14 and shunt 44 follow the movement of the float to operate the relay, as described hereinabove.

As it will be obvious to those skilled in the art that various changes and modifications may be made in order to adapt it to different conditions without departing from the scope hereof, it is intended that all matter contained in the above description or shown on the accompanying drawings be interpreted as illustrative and not in a limiting sense.

What is claimed is:

In a liquid level control device for actuating electrical and pneumatic circuits, the combination comprising a housing, a tube mounted within said housing, a magnetic relay adjustably mounted on said tube, said relay including a permanent magnet, first and second pole shoes mounted on the magnet, non-magnetic spacer means mounted between the first pole shoe and said magnet to prevent short cycling of said relay, an armature pivotally connected to the second pole shoe adapted to actuate switch means for opening and closing an associated external circuit, a float adapted to move in response to liquid level variations, a stem having one end portion connected to the float, shunt means mounted on the other end portion of the stem opposite the float, said shunt being slidable within the tube into and out of the magnetic relay in response to movement of the float, a bimetallic return spring operatively connected to the armature to compensate for change in magnetic pull on the armature due to variation in the ambient temperature, said spring being so formed that its force varies with temperature in the same direction and by substantially the same degree that the magnetic pull on the armature varies with temperature, whereby a proper force-balance is maintained over a wide range of temperature, and adjusting screw means carried by said armature and operatively connected to said bimetallic return spring for adjusting the biasing force acting on said armature.

(References on following page)

References Cited by the Examiner

UNITED STATES PATENTS

| | | | |
|---|---|---|---|
| 519,382 | 5/1894 | Engel | 200—84 |
| 970,951 | 9/1910 | Reubold | 200—84 |
| 1,576,768 | 3/1926 | Louden | 200—87 |
| 2,098,926 | 11/1937 | Schneider | 200—87 |
| 2,142,680 | 1/1939 | Schrode | 200—84 |
| 2,443,968 | 6/1948 | Swing | 200—87 |
| 2,467,073 | 4/1949 | Binford | 200—84 |
| 2,576,561 | 11/1951 | Binford | 200—84 |
| 2,726,296 | 12/1955 | Hanson et al. | 200—84 |
| 2,785,345 | 3/1957 | Chabala | 200—87 |
| 2,788,412 | 4/1957 | Heath | 200—87 |
| 2,794,090 | 5/1957 | Ertl et al. | 200—87 |
| 2,980,775 | 4/1961 | Crain | 200—84 |
| 3,145,277 | 8/1964 | Senn | 200—84 |

BERNARD A. GILHEANY, *Primary Examiner.*

E. JAMES SAX, *Examiner.*

A. M. LESNIAK, H. A. LEWITTER,
*Assistant Examiners.*